Jan. 14, 1930.                    C. BETHEL                    1,743,098
                           RAILWAY DRIVE MECHANISM
                            Filed June 22, 1922        3 Sheets-Sheet 1

WITNESSES:                                              INVENTOR
                                                      Claude Bethel
                                                         BY
                                                              ATTORNEY Jan. 14, 1930. C. BETHEL 1,743,098
RAILWAY DRIVE MECHANISM
Filed June 22, 1922 3 Sheets-Sheet 2

WITNESSES:
R. S. Harrison
W. B. Jaspert.

INVENTOR
Claude Bethel
BY
Wesley G. Carr
ATTORNEY

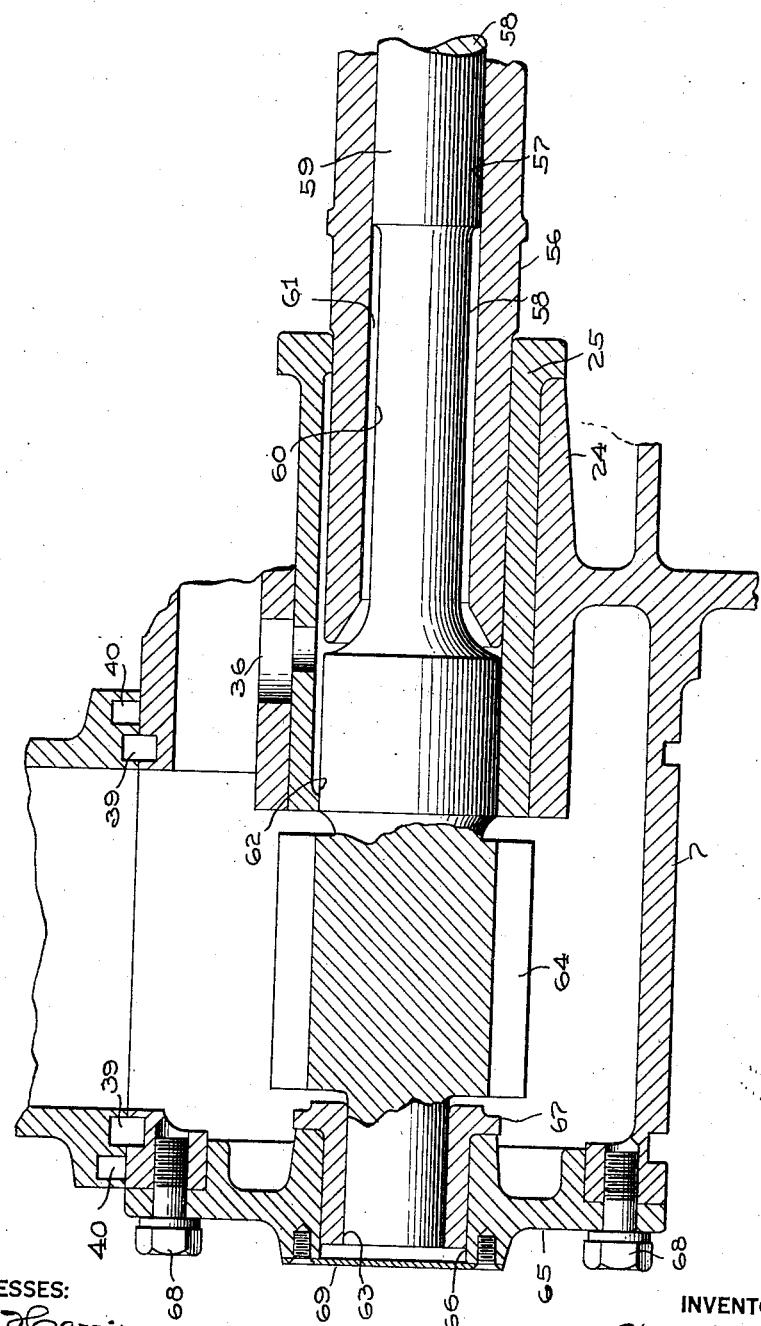

Patented Jan. 14, 1930

1,743,098

UNITED STATES PATENT OFFICE

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA

RAILWAY DRIVE MECHANISM

Application filed June 22, 1922. Serial No. 570,048.

My invention relates to electric railway driving mechanism, more especially to the structural members for housing the motor gear and gear shaft.

It is among the objects of this invention to provide a structure for mounting railway drive mechanism that shall be of such construction as will minimize axle bearing and gear wear and which shall provide flexibility between the gear axle and the armature.

It is a further object of this invention to provide a structure of the above-designated character which shall protect the bearings and other wearing members from dirt, which shall reduce the vibration of such parts and which shall maintain the gear-center distances and generally prolong the life of the driving mechanism.

In electric-railway-motor mountings heretofore employed, difficulties have developed from loose and worn axle bearings that resulted in vibration of the motor and necessitated frequent renewals of the wearing parts.

My present invention is directed to a structure that will obviate these difficulties by employing an integral gear case and axle housing which is separate from the motor frame but secured thereto and which in itself comprises a lubricating chamber from which the bearings and the motor pinion and gear are lubricated by means of an oil splash. The structure I propose further permits the use of a flexible shaft which is not permissible in ordinary structures as it requires a structure which will adequately resist the gear thrust.

Figure 1:
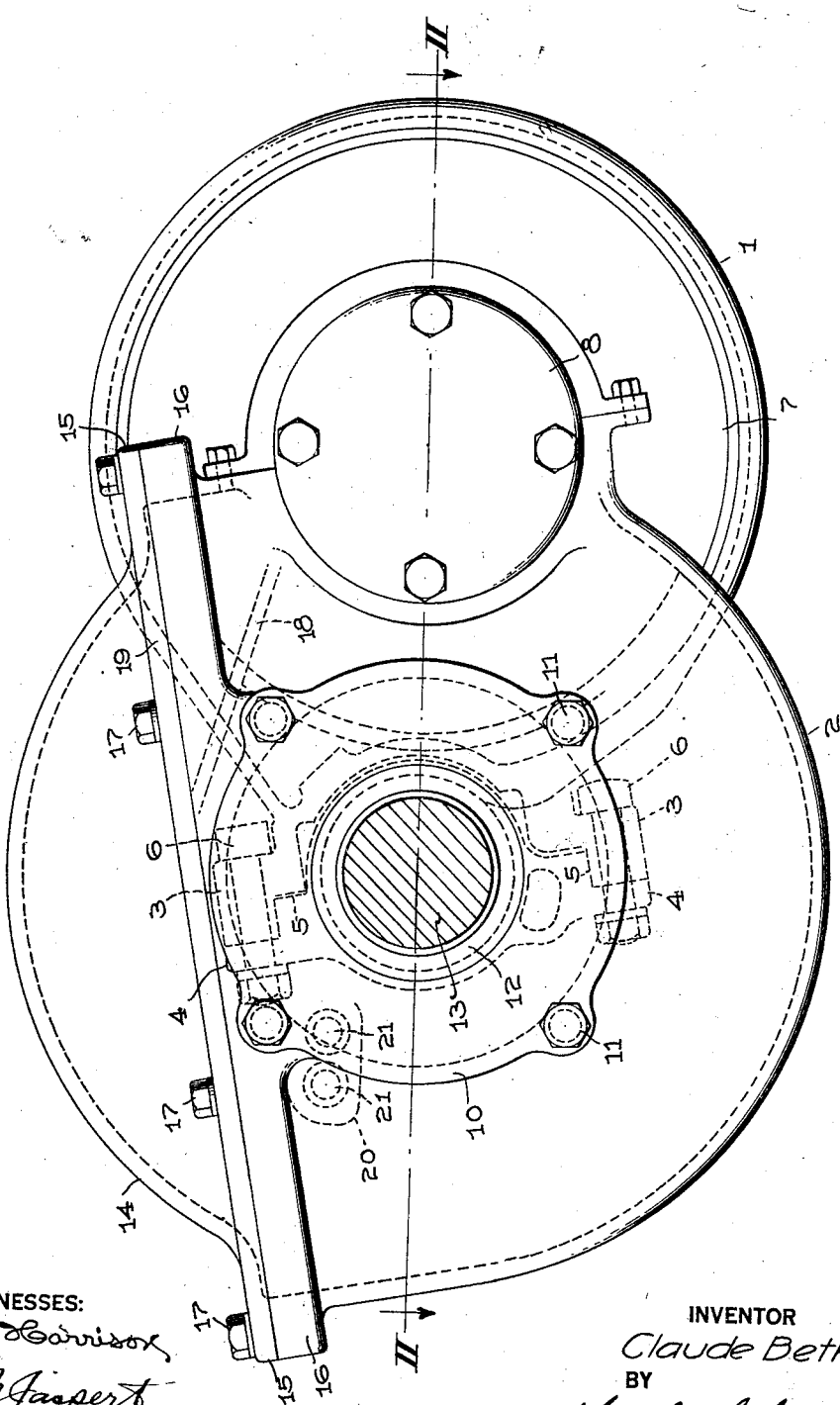
Figure 2:
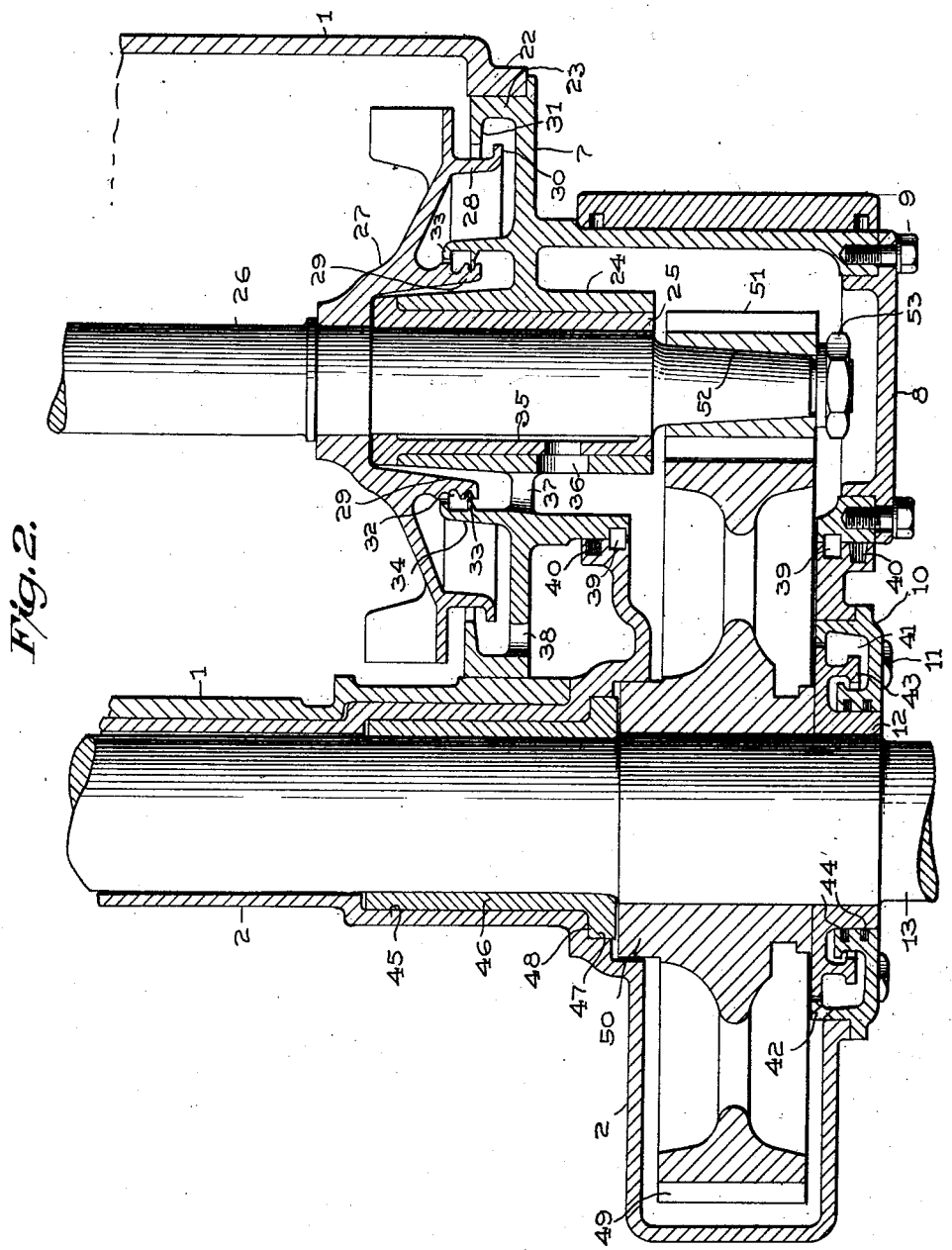

In the accompanying drawings constituting a part hereof and in which like reference numerals designate like parts, Figure 1 is a side elevational view of a combined gear case and motor housing embodying the principles of this invention;

Fig. 2 is a sectional view of a fragmentary portion thereof taken along the line II—II of Fig. 1; and Fig. 3 is a fragmentary sectional view of a modified type of gear bracket which adapts my structure for the use of a flexible pinion shaft.

Referring to the Fig. 1, my device consists of a motor housing 1 secured to a gear case 2 by a plurality of mounting lugs 3 and 4 formed integral therewith which are provided with a splined seating surface 5 and secured by a plurality of bolts 6. The motor housing 1 is adapted to receive an end bracket 7 having a central opening which is closed by a cover 8 secured with a plurality of cap screws 9. The gear case 2 is opened at one end and is provided with an annular cover 10 which is fastened to the gear case by a plurality of bolts 11. The annular cover 10 is adapted to receive a collar 12 which is rotatably mounted therein and secured to a gear axle 13. The gear case is further provided with a cover 14 having a seating flange 15 which is mounted on a correspondingly shaped seat 16 comprising an integral part of the casing 2 and is secured thereto by a plurality of bolts 17.

The motor housing is re-enforced by a plurality of cross ribs 18 and 19 to form a rigid construction and also to provide baffle walls for the lubricating chamber and a projecting lug 20, having a plurality of openings 21 for securing a pipe line (not shown) which communicates with a suitable source of lubrication, is formed integral with the gear case 2.

Referring to the Fig. 2, the motor housing 1 is provided with a constricted end 22 adapted to receive a flange seat 23 of the end bracket 7. The end bracket 7 is provided with a bearing housing 24 which is adapted to receive a motor bearing 25 in which a pinion shaft 26 is rotatably mounted. A fan 27 is mounted on the shaft 26 and is provided with a plurality of projecting flanges 28 and 29. The flange 28 constitutes an oil thrower having a projecting flange 30 which is in co-operative alignment with a depending flange 31 of the bracket 7. The flange 29 has a plurality of groove 32 which are in co-operative alignment with a plurality of baffle flanges 33 projecting on a flange 34 of the bracket 7. The motor bearing 25 is provided with an oil groove 35 which is in communication with the oil chamber of the gear case through an opening 36. A plurality of similar openings 37 and 38 establish communication between the gear case and the drainage chamber, respectively.

A plurality of co-operating grooves 39 formed at the joint of the end bracket and gear cases 7 and 2, respectively, provide an oil drainage, and the gear case 2 is further provided with parallel grooves 40, in which a suitable packing material, such as felt, is secured to establish a leak-proof joint. The annular cover 10 is provided with a recess or drainage chamber 41 communicating with the main chamber of the gear case through a drain hole 42, and the collar 12 is provided with a flange 43 which projects into the recess 41 and constitutes an oil thrower.

The annular cover 10 is further provided with a plurality of parallel packing grooves 44 which are filled with a suitable material, such as felt, to provide a leak-proof joint with the collar 12. The gear axle housing 2, constituting an integral part of the gear case 2, is provided with enlarged recesses 45 at each end which are adapted to receive axle bearings 46 having flanges 47 on one end seating into correspondingly shaped recesses 48 of the axle housing.

A gear wheel 49 is disposed within the gear case 2 and securely mounted on the axle 13. The gear wheel is provided with an extending hub 50 to provide a larger seating area on the axle and is in co-operative alignment with a pinion 51 mounted on the tapered end 52 of the pinion shaft 26. The pinion 51 is secured to the shaft by a screw nut 53 fastened on the threaded end thereof.

As shown in Fig. 3, the end bracket 7 may be modified to adapt it for the use of a flexible pinion shaft which consists of a hollow armature shaft 56 having a central opening 57 adapted to receive a flexible shaft 58 which is secured therein by a suitable press-fit at its enlarged end 59. The pinion shaft 58 is provided with a reduced body portion 60 of less diameter than the opening 57 to provide a clearance 61. An enlarged body portion 62 of the shaft 58 rotatably seats in the motor bearing 25 to provide a support near the pinion seat, and the free end of the shaft is reduced to form an end bearing 63. A pinion 64 constitutes an integral part of the shaft 58, which construction is desirable where a minimum number of teeth are required.

An end cap 65, provided with a central opening 66 in alignment with the shaft 58, is adapted to receive a bearing bushing 67 and is secured to the bracket 7 by a plurality of bolts 68. The cap 65 constitutes an outboard bearing for the flexible shaft 58. An end plate 69 is fastened over the opening 66 to provide a sealed chamber which communicates with the main gear case 2.

In other respects, the motor housing and gear case are the same as illustrated in Fig. 2, having the same lubricating chamber recesses, drainage grooves and the like, as described above.

It is evident from the above description of my invention that a railway drive mechanism made in accordance therewith provides a compact structure which is readily accessible for renewal or removal of the various working parts, and that, by the large lubricating chamber provided in the unitary structure, an adequate supply of lubricant is provided to all the rotating and wearing members, thus obtaining better wear and longer service life. The housings, being entirely closed, will prevent access of dirt and other foreign substances, which is a decided advantage as it will prevent clogging of the lubricating system and corrosion of the machine surfaces of the housing members. The strong, unitary mechanical structure will provide rigidity between the motor housing, axle housing and gear case and, consequently, reduce vibration which has been the cause of rapid wear and misalignment of the gears and axle members.

Although I have described a specific embodiment of my invention, it will be obvious to those skilled in the art that various changes may be made in the details of construction. For instance, the end brackets 7 may constitute an integral part of the motor housing or the gear casing. The outboard bearings of the gear and pinion shafts may constitute an integral part of the casing, or the general arrangement of the lubricating and drain system may be modified by changing the proportions of the baffle flanges and oil throwers, and the sealing of the joints between the motor housing, end brackets and gear case may be accomplished in various ways other than those illustrated.

These and other changes may be made in the details of construction without departing from the principles herein set forth.

I claim as my invention:

1. A mounting for an electric-railway drive mechanism comprising rotating members having axles, a motor frame, and end bracket therefor, and a gear case and axle housing, said end bracket and gear case having a plurlity of openings adapted to receive the rotating members and a plurality of covers secured to said openings, some of which constitute outboard bearings for said axles.

2. A mounting for an electric railway drive mechanism comprising a motor frame, an end bracket provided with bearing housings secured to said frame, an integral gear case and axle housing, and axles journalled in the motor frame and the axle housing, said housings being adapted to receive solid bearing sleeves for their respective axles.

3. An electric-railway drive mechanism comprising a driving motor, an end bracket therefor, a flexible shaft having a reduced body portion secured in the armature shaft of said motor, and an integral gear case and axle housing secured to said motor and end bracket, said flexible shaft having gear teeth formed therein and having a bearing portion on both sides of said teeth.

4. An electric-railway drive mechanism comprising a driving motor, an end bracket therefor, a flexible shaft having a reduced body portion secured in the armature shaft of said motor, and an integral gear case and axle housing secured to said motor and end bracket, said flexible shaft having a plurality of bearing body portions and a gear secured therebetween.

In testimony whereof, I have hereunto subscribed my name this 15th day of June, 1922.

CLAUDE BETHEL.